(12) United States Patent
Lai

(10) Patent No.: US 8,405,313 B2
(45) Date of Patent: Mar. 26, 2013

(54) LIGHT EMITTING DIODE LAMP

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 315 days.

(21) Appl. No.: 12/898,719

(22) Filed: Oct. 6, 2010

(65) Prior Publication Data

US 2012/0032589 A1    Feb. 9, 2012

(30) Foreign Application Priority Data

Aug. 3, 2010   (TW) ............................... 99125671 A

(51) Int. Cl.
*H01K 1/62*   (2006.01)
(52) U.S. Cl. .............................. 315/32; 315/71; 315/192
(58) Field of Classification Search .................. 315/224, 315/185 R, 192, 291, 294, 297, 299, 300, 315/301, 302, 311, 312, 361, 177, 200 R
See application file for complete search history.

(56) References Cited

U.S. PATENT DOCUMENTS 4,298,869 A  *  11/1981  Okuno .......................... 345/82

FOREIGN PATENT DOCUMENTS

CN           1859821 A       11/2006

* cited by examiner

*Primary Examiner* — Douglas W Owens
*Assistant Examiner* — Jianzi Chen
(74) *Attorney, Agent, or Firm* — Altis Law Group, Inc.

(57) ABSTRACT

An LED lamp includes a first LED string and a second LED string connected in parallel to each other and a variable resistor connected in series with one of the first and second LED strings. The first LED string provides a first color temperature. The LED string provides a second color temperature difference from the first color temperature. The variable resistor includes a resistance track with resistance coils wound thereon and a slider moveable along the resistance track. When a position of the slider of the variable resistor is changed, an electric current flowing through the one of the first and second strings is changed accordingly to adjust the color temperature of the LED lamp.

20 Claims, 6 Drawing Sheets

LIGHT EMITTING DIODE LAMP

BACKGROUND

1. Technical Field

The present disclosure relates to an illumination device, and particularly to a light emitting diode (LED) lamp providing an adjustable color temperature.

2. Description of Related Art

At present, light emitting diodes (LEDs) are widely used due to high brightness, wide color gamut and rapid response speed. With the rapid development of decorative illuminations for both commercial and residential, the demand for using LEDs in lamp for decorative illumination is ever increasing.

It is important for the decorative illumination to have a sufficient light energy in a correct color temperature since the color temperature affects the sensation of user's eyes. Thus, there is a need for a lamp which can emit light with an adjustable color temperature. However, the function of most conventional LED lamps for adjusting the color temperature is achieved by varying pulse width modulation (PWM) signals supplied thereto. Therefore, drive circuit for the LED lamps must include a PWM drive chip and many complicated peripheral circuits, which badly affects an illumination efficiency of the LED lamps and increases costs.

It is thus desirable to provide an LED lamp which can overcome the described limitations.

DETAILED DESCRIPTION

Figure 1:
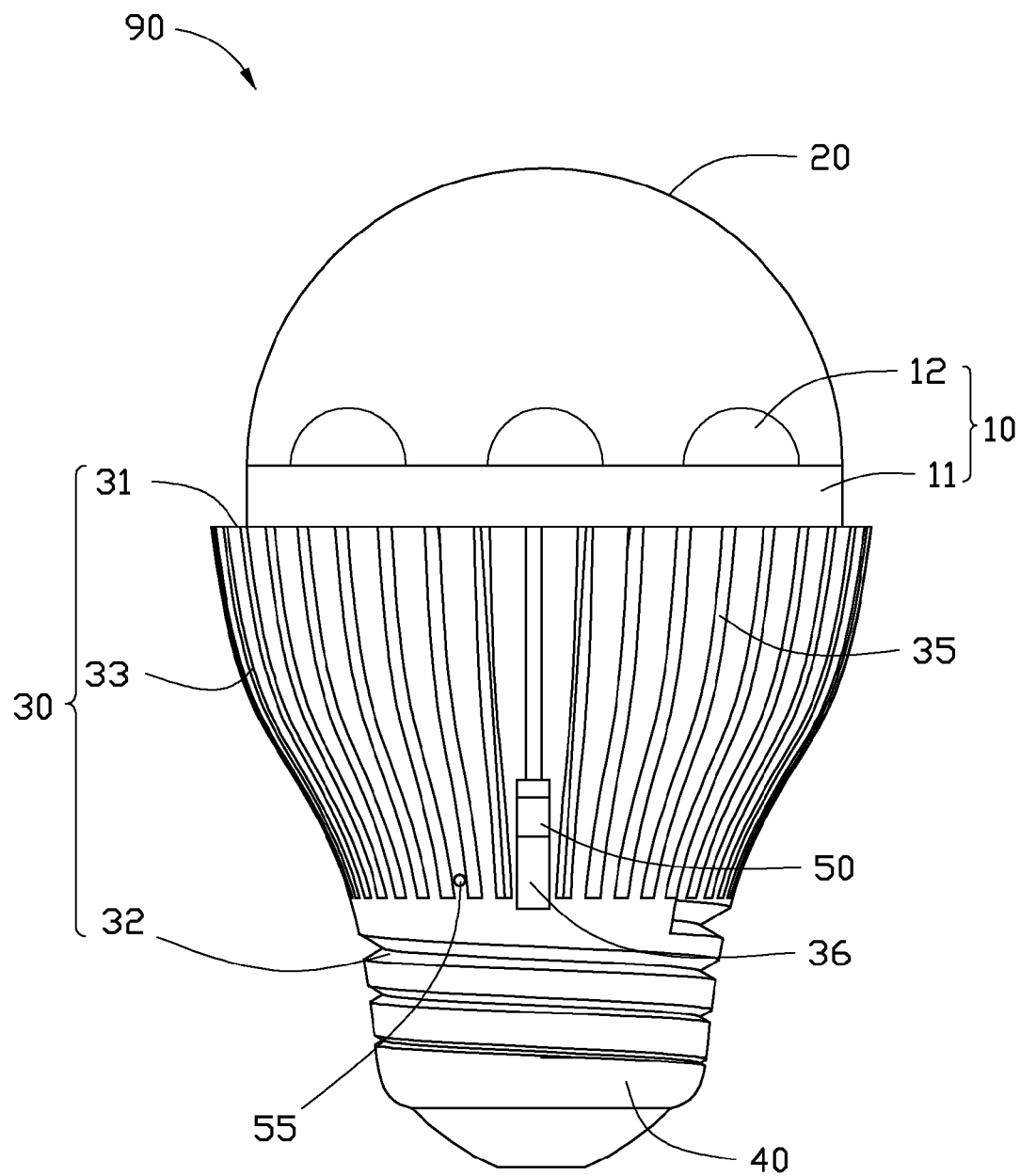
FIG. 1 is an isometric, assembled view of an LED lamp in accordance with an exemplary embodiment of the present disclosure.

Reference will now be made to the drawing figures to describe the present LED lamp in detail.

Referring to FIG. 1, an LED lamp 90 according to an exemplary embodiment of the present disclosure is shown. The LED lamp 90 includes an LED light source 10, an envelope 20 covering the LED light source 10 therein, a heat sink 30 thermally connected with the LED light source 10, a connecting head 40 electrically connected with the LED light source 10, and an adjustment button 50.

Figure 2:
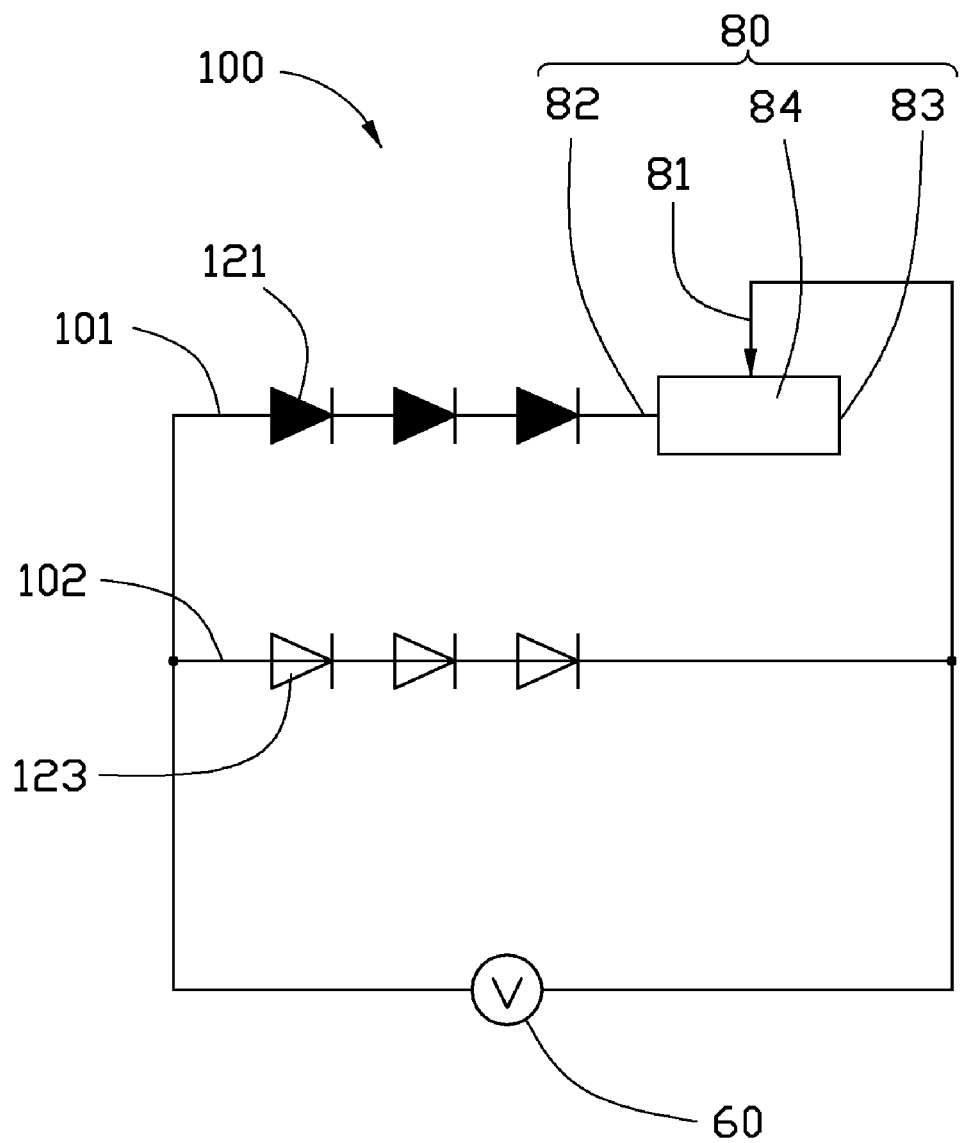
FIG. 2 is a schematic view of a circuit of the LED lamp in accordance with a first embodiment of the present disclosure.

The LED light source 10 includes a circular substrate 11 and a plurality of LEDs 12 mounted on the substrate 11. Referring to FIG. 2, the LEDs 12 includes a plurality of first LEDs 121 connected in series with each other and providing a first color temperature and a plurality of second LEDs 123 connected in series with each other and providing a second color temperature different from the first color temperature. For providing a broad emission bandwidth, the first LEDs 121 emit cold color with the first color temperature of about 6500K, and the second LEDs 123 emit warm color with the second color temperature of about 2800K in this embodiment.

The envelope 20 is a hollow hemisphere shape, and defines an opening at a bottom side thereof. The envelope 20 connects a periphery edge of the substrate 11 to seal the opening, thereby defining a sealed receiving space therebetween for receiving the LED light source 10 therein.

The heat sink 30 is integrally made of a metal with good heat conductivity such as aluminum, copper or an alloy thereof. The heat sink 30 includes a circular top surface 31, a circular bottom surface 32 less than the top surface 31 and a tapered side surface 33 interconnected between the top and bottom surfaces 31, 32. The LED light source 10 is mounted on the top surface 31. A plurality of axially grooves 35 is defined in the side surface 33 of the heat sink 30. The grooves 35 are equally spaced from each other along a circumference direction of the side surface 33 of the heat sink 30. The grooves 35 can increase an outer surface area of the heat sink 30, to thus promote a heat dissipation performance of the heat sink 30. An elongated cutout 36 is defined at a bottom portion of the side surface 33 of the heat sink 30.

The adjustment button 50 is received in the elongated cutout 36. The adjustment button 50 is slidably along the elongated cutout 36, to adjust a color temperature of the LED lamp 90. Alternatively, the adjustment button 50 can be a rotatable button which is rotatablely around a central axis thereof, to adjust the color temperature of the LED lamp 90.

The connecting head 40 is electrically connected with the LED light source 10, and mounted on the bottom surface 32 of the heat sink 30. When used, the connecting head 40 of the LED lamp 90 electrically connects a direct current (DC) power source 60 (FIGS. 2, 3 and 4) or an alternating current (AC) power source 70 (FIGS. 5 and 6), such that the LED light source 10 can get an electrical power from the DC power source 60 or the AC power source 70 to emit light.

Referring back to FIG. 2, a circuit 100 is shown for illustrating the LED lamp 90 electrically connected to the DC power source 60 for working. The first LEDs 121 are connected in series to form a first LED string 101. The second LEDs 123 are connected in series to form a second LED string 102. The first LED string 101 and the second LED string 102 are connected in parallel. A variable resistor 80 is connected in series with the first LED string 101. The variable resistors 80 includes a resistance track 84 with resistance coil wound around thereon, first and second connecting posts 82, 83 at two opposite ends of the resistance track 84, respectively, and a slider 81 moveable along the resistance track 84 to change a resistance between the slider 81 and a corresponding connecting post 82, 83.

In this circuit 100, anodes of the first and second LED strings 101, 102 connect a positive pole of the DC power source 60. One of the first and second connecting posts 82, 83, i.e., the first connecting post 82 in this embodiment, of the variable resistor 80 connects a cathode of the first LED string 101. The slider 81 of the variable resistor 80 connects a negative pole of the DC power source 60. Cathode of the second LED string 102 connects the negative pole of the DC power source 60 directly. With this configuration, a portion of the resistance between the first connecting post 82 and the slider 81 of the variable resistor 80 is connected in series with the first LED string 101. When the slider 81 of the variable resistor 80 is moved along the resistance track 84 towards the first connecting post 82, the resistance between the first connecting post 82 and the slider 81 is reduced, and when the slider 81 of the variable resistor 80 is moved along the resistance track 84 towards the second connecting post 83, the resistance between the first connecting post 82 and the slider 81 is increased.

The slider 81 of the variable resistor 80 is connected with the adjustment button 50. When the adjustment button 50 is moved upwardly along the elongated cutout 36, the slider 81 of the variable resistor 80 follows the adjustment button 50 to move along the resistance track 84 towards the first connecting post 82. Thus, the portion of the resistance connected in series with the first LED string 101 of the variable resistor 80 is reduced. Accordingly, a first electric current flowing through the first LED string 101 is increased, thereby increasing a light intensity of light emitted from the first LED string 101, while a second electric current flowing through the second LED string 102 remains unchanged. Due to a light of the LED lamp 90 is a mixture of the light of the first LED string 101 and the light of the second LED string 102, when the light intensity of the first LED string 101 is increased, the color temperature of the LED lamp 90 is more closer to the color temperature of the first LED string 101, such that the color temperature of the LED lamp 90 is increased.

On the contrary, when the adjustment button 50 is moved downwardly along the elongated cutout 36, the slider 81 of the variable resistor 80 follows the adjustment button 50 to move towards the second connecting post 83. Thus, the portion of the resistance connected in series with the first LED string 101 of the variable resistor 80 is increased. Accordingly, the first electric current flowing through the first LED string 101 is decreased, thereby decreasing the light intensity of the first LED string 101, while the second electric current flowing through the second LED string 102 remains unchanged. When the light intensity of the first LED string 101 is decreased, the color temperature of the LED lamp 90 is much closer to the second LED string 102, such that the color temperature of the LED lamp 90 is decreased.

In the present disclosure, the LED lamp 90 includes the variable resistor 80 connected in series with the first LED string 101, and the first and second LED strings 101, 102 connected in parallel to each other, such that when the portion of the resistance which is connected in series with the first LED string 101 of the variable resistor 80 is increased (decreased), the first electric current flowing through the first LED string 101 is decreased (increased). Therefore, a percentage of light of the first LED string 101 and the second LED string 102 is changed, thereby changing the color temperature of the LED lamp 90. The circuit 100 is simple and includes minimum of electronic components, which provides lower costs.

Figure 3:
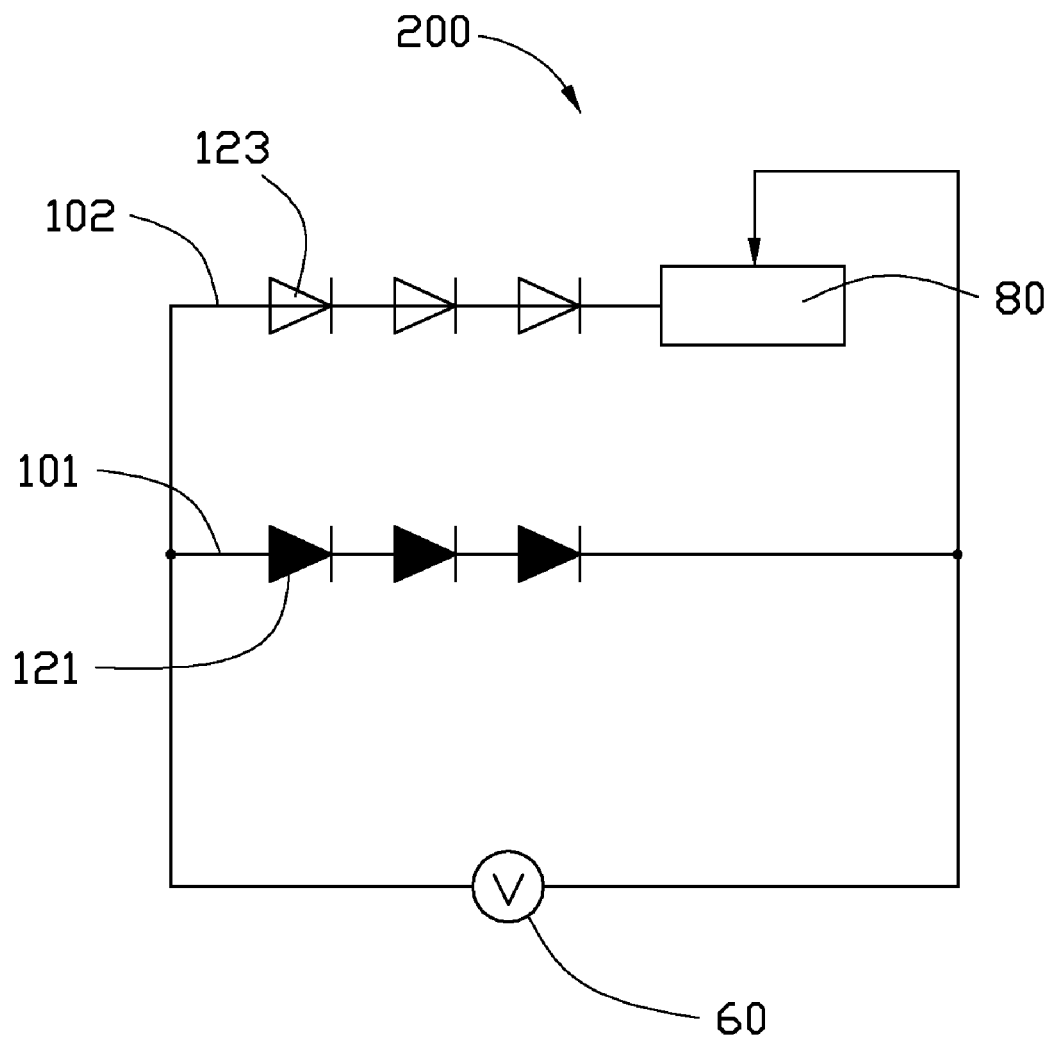
FIG. 3 is a schematic view of a circuit of the LED lamp in accordance with a second embodiment of the present disclosure.

Referring to FIG. 3, a circuit 200 is shown for illustrating the LED lamp 90 electrically connected to the DC power source 60 for working, according to a second embodiment. The circuit 200 differs from the previous circuit 100 only in that the variable resistor 80 is connected in series with the second LED string 102. More specifically, the first connecting post 82 of the variable resistor 80 connects the cathode of the second LED string 102, and the slider 81 of the variable resistor 80 connects the negative pole of the DC power source 60. Thus, when the position of the slider 81 of the variable resistor 80 along the resistance track 84 is changed, the second electric current flowing through the second LED string 102 is changed accordingly, thereby adjusting the color temperature of the LED lamp 90.

Figure 4:
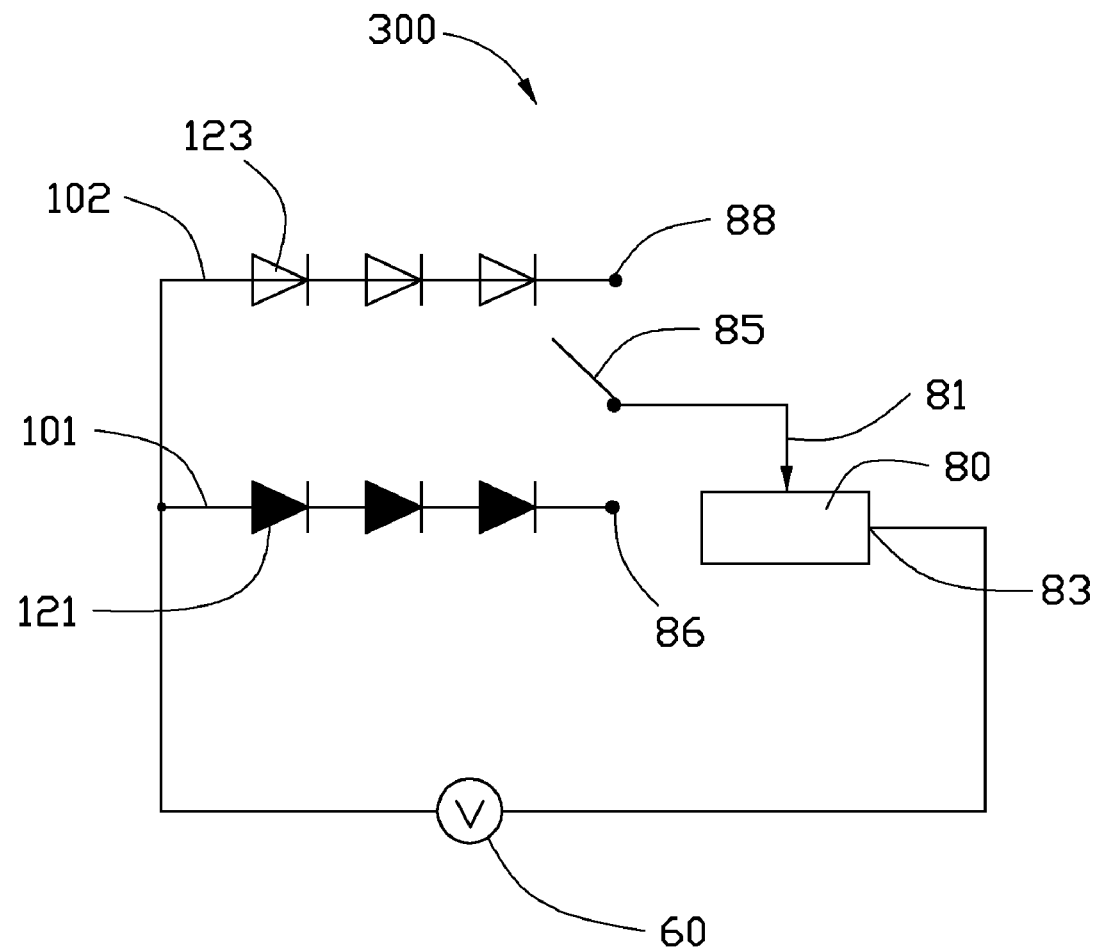
FIG. 4 is a schematic view of a circuit of the LED lamp in accordance with a third embodiment of the present disclosure.

Referring to FIG. 4, a circuit 300 is shown for illustrating the LED lamp 90 electrically connected to the DC 60 for working, according to a third embodiment. The circuit 300 differs from the previous circuit 100 only in that a switch 85 is interconnected between the variable resistor 80 and the LEDs 12. One of the connecting posts 82, 83, i.e., the second connecting post 83 in this embodiment, of the variable resistor 80 connects the negative pole of the DC power source 60. The slider 81 is electrically connected with the switch 85. The switch 85 includes a first contact point 86 connected with the first LED string 101 and a second contact point 88 connected with the second LED string 102. The switch 80 can be switched between a first state that the switch 80 electrically connects the first contact point 86 and a second state that the switch 80 electrically connects the second contact point 88. Referring back to FIG. 1, the LED lamp 90 which adopts the circuit 300 further includes a selector button 55 connected with the switch 85. The selector button 55 is circular shaped, and rotatablely around a central axis thereof, to control the switch 80 to work at the first state or the second state.

When the switch 80 works at the first state, the slider 81 of the variable resistor 80 electrically connects the first LED string 101 via the switch 80 to form a close circuit between the first LED string 101 and the DC power source 60, while an open circuit is formed between the second LED string 102 and the DC power source 60. At this state, the first LED string 101 emits light, but the second LED string 102 is non-luminous. Thus, the color temperature of the light of the LED lamp 90 is equal to that of the first LED string 101. Then, the adjustment button 50 can be moved downwardly or upwardly along the elongated cutout 36 to change the position of the slider 81 of the variable resistor 80. Thus, an electric current flowing through the first LED string 101 is changed accordingly, to adjust the color temperature of the first LED string 101 (accordingly, the LED lamp 90) further. In the contrary, when the switch 80 works at the second state, the slider 81 of the variable resistor 80 electrically connects the second LED string 102 via the switch 80 to form a close circuit between the second LED string 102 and the DC power source 60, while an open circuit is formed between the first LED string 101 and the DC power source 60. At this state, the second LED string 102 emits light, but the first LED string 101 is non-luminous. Thus, the color temperature of the light of the LED lamp 90 is equal to that of the second LED string 102. Then, the adjustment button 50 can be moved downwardly or upwardly to change the position of the slider 81 of the variable resistor 80. Thus, an electric current flowing through the second LED string 102 is changed accordingly, to adjust the color temperature of the second LED string 102 (and accordingly the LED lamp 90) further.

Figure 5:
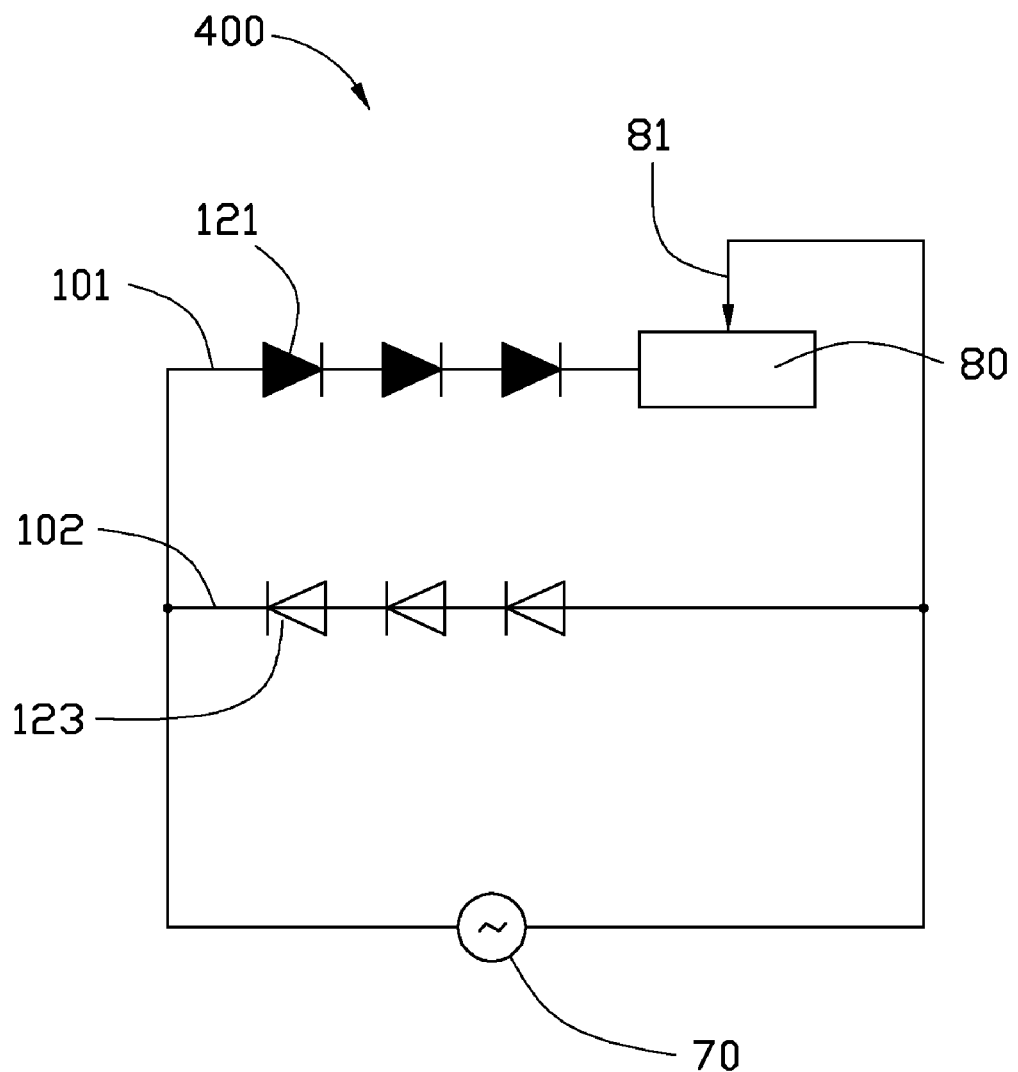
FIG. 5 is a schematic view of a circuit of the LED lamp in accordance with a fourth embodiment of the present disclosure.

Referring to FIG. 5, a circuit 400 is shown for illustrating the LED lamp 90 electrically connected to the AC power source 70 for working, according to a fourth embodiment. The circuit 400 differs from the previous circuit 100 only in that the first and second LED strings 101, 102 are connected in parallel by anti-polar. More specifically, the anode of the first LED string 101 and the cathode of the second LED string 102 both connect one pole of the AC power source 70 directly. The variable resistor 80 is interconnected between the cathode of the second LED string 102 and another pole of the AC power source 70. The anode of the second LED string 102 connects the another pole of the AC power source 70 directly. In this embodiment, the color temperature of the LED lamp 90 can be changed by changing position of the slider 81 of the variable resistor 80 as the same way of the previous circuit 100.

Figure 6:
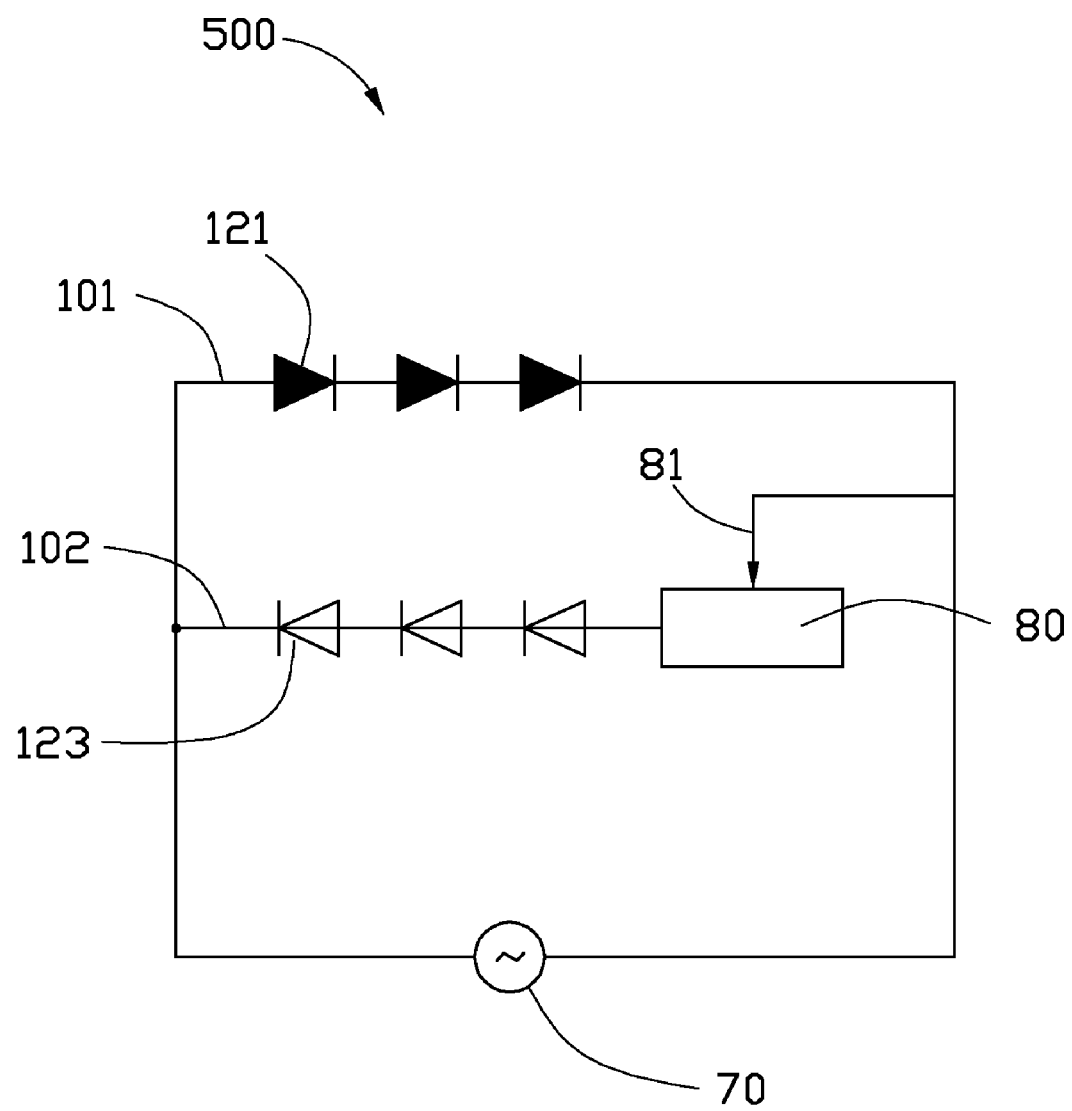
FIG. 6 is a schematic view of a circuit of the LED lamp in accordance with a fifth embodiment of the present disclosure.

Referring to FIG. 6, another circuit 500 is shown for illustrating the LED lamp 90 electrically connected to the AC power source 70 for working, according to a fifth embodiment. The circuit 500 differs from the previous circuit 400 only in that the variable resistor 80 is connected in series with the second LED string 102. That is, the variable resistor 80 is interconnected between the anode of the second LED string 102 and the another pole of the AC power source 70.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED lamp, comprising:
    a first LED string providing a first color temperature;
    a second LED string connected in parallel with the first LED string, the second LED string providing a second color temperature difference from the first color temperature;
    a variable resistor connected in series with one of the first and second LED strings, the variable resistor comprising a resistance track with resistance coils wound thereon and a slider moveable along the resistance track; and
    a heat sink thermally connecting the first and second LED strings;
    wherein when a position of the slider of the variable resistor is changed, an electric current flowing through the one of the first and second LED strings is changed accordingly to adjust the color temperature of the LED lamp; and
    wherein an elongated cutout is defined in the heat sink with an adjustment button received therein, and the adjustment button is slideable along the elongated cutout to thereby change the position of the slider of the variable resistor.

2. The LED lamp of claim 1, wherein anodes of the first and second LED strings connect one pole of a DC power source, the variable resistor is interconnected between cathode of the first LED string and another pole of the DC power source, and cathode of the second LED string directly connects the another pole of the DC power source.

3. The LED lamp of claim 2, wherein when the position of the slider of the variable resistor is changed, the electric current flowing through the first LED string is changed accordingly, while the electric current flowing through the second LED string remains unchanged.

4. The LED lamp of claim 1, wherein anodes of the first and second LED strings connect one pole of a DC power source, the variable resistor is interconnected between cathode of the second LED string and another pole of the DC power source, and cathode of the first LED string directly connects the another pole of the DC power source.

5. The LED lamp of claim 4, wherein when the position of the slider of the variable resistor is changed, the electric current flowing through the second LED string is changed accordingly, while the electric current flowing through the first LED string remains unchanged.

6. The LED lamp of claim 1, further comprising a switch connected with the variable resistor, the switch comprising a first contact point connected with the first LED string and a second contact point connected with the second LED string, wherein the switch is switchable between a first state that the switch electrically connects the first contact point and a second state that the switch electrically connects the second LED string.

7. The LED lamp of claim 6, wherein anodes of the first and second LED strings connect one pole of the DC power supply, the first and second contact points connected with cathodes of the first and second LED strings, respectively, when the switch is at the first state, a close circuit being formed between the first LED string and the DC power supply and an open circuit being formed between the second LED string and the DC power supply; when the switch is at the second state, a close circuit being formed between the second LED string and the DC power supply and an open circuit being formed between the first LED string and the DC power supply.

8. The LED lamp of claim 1, wherein anode of the first LED string and cathode of the second LED string connect one pole of an AC power source, the variable resistor interconnected between cathode of the first LED string and another pole of the AC power source, anode of the second LED string directly connected with the another pole of the AC power source.

9. The LED lamp of claim 1, wherein anode of the first LED string and cathode of the second LED string connect one pole of the an AC power source, the variable resistor interconnected between anode of the second LED string and another pole of the AC power source, cathode of the first LED string directly connected with the another pole of the AC power source.

10. The LED lamp of claim 1, wherein the first LED string comprises a plurality of first LEDs connected in series with each other, the first LEDs emitting in cold color, the second LED string comprising a plurality of second LEDs connected in series with each other, the second LEDs emitting in warm color.

11. The LED lamp of claim 1, wherein the heat sink comprises a circular top surface for supporting the first and second LED strings thereon, a circular bottom surface spaced from the top surface and a tapered side surface interconnected between the top and bottom surfaces, a plurality of axially grooves equally spaced from each other along a circumference direction thereof being defined in the side surface of the heat sink.

12. The LED lamp of claim 11, further comprising a connecting head mounted on the bottom surface of the heat sink, the connecting head electrically connecting with the first and second LED strings, the connecting head being configured to connect a power source for receiving electrical power therefrom.

13. An LED lamp, comprising:
    a first LED string providing a first color temperature;
    a second LED string connected in parallel with the first LED string, the second LED string providing a second color temperature difference from the first color temperature; and
    a variable resistor connected in series with one of the first and second LED strings, the variable resistor comprising a resistance track with resistance coils wound thereon and a slider moveable along the resistance track;
    wherein when a position of the slider of the variable resistor is changed, an electric current flowing through the one of the first and second LED strings is changed accordingly to adjust the color temperature of the LED lamp; and
    wherein anodes of the first and second LED strings connect one pole of a DC power source, the variable resistor is interconnected between cathode of the first LED string and another pole of the DC power source, and cathode of the second LED string directly connects the another pole of the DC power source.

14. The LED lamp of claim 13, wherein when the position of the slider of the variable resistor is changed, the electric current flowing through the first LED string is changed accordingly, while the electric current flowing through the second LED string remains unchanged.

15. An LED lamp, comprising:
a first LED string providing a first color temperature;
a second LED string connected in parallel with the first LED string, the second LED string providing a second color temperature difference from the first color temperature; and
a variable resistor connected in series with one of the first and second LED strings, the variable resistor comprising a resistance track with resistance coils wound thereon and a slider moveable along the resistance track;
wherein when a position of the slider of the variable resistor is changed, an electric current flowing through the one of the first and second LED strings is changed accordingly to adjust the color temperature of the LED lamp; and
wherein anodes of the first and second LED strings connect one pole of a DC power source, the variable resistor is interconnected between cathode of the second LED string and another pole of the DC power source, and cathode of the first LED string directly connects the another pole of the DC power source.

16. The LED lamp of claim 15, wherein when the position of the slider of the variable resistor is changed, the electric current flowing through the second LED string is changed accordingly, while the electric current flowing through the first LED string remains unchanged.

17. An LED lamp, comprising:
a first LED string providing a first color temperature;
a second LED string connected in parallel with the first LED string, the second LED string providing a second color temperature difference from the first color temperature;
a variable resistor connected in series with one of the first and second LED strings, the variable resistor comprising a resistance track with resistance coils wound thereon and a slider moveable along the resistance track; and
a switch connected with the variable resistor, the switch comprising a first contact point connected with the first LED string and a second contact point connected with the second LED string, wherein the switch is switchable between a first state that the switch electrically connects the first contact point to electrically connect the first LED string and a second state that the switch electrically connects the second contact point to electrically connect the second LED string; and
wherein when a position of the slider of the variable resistor is changed, an electric current flowing through the one of the first and second strings is changed accordingly to adjust the color temperature of the LED lamp.

18. The LED lamp of claim 17, wherein anodes of the first and second LED strings connect one pole of the DC power supply, the first and second contact points connected with cathodes of the first and second LED strings, respectively, when the switch is at the first state, a close circuit being formed between the first LED string and the DC power supply and an open circuit being formed between the second LED string and the DC power supply; when the switch is at the second state, a close circuit being formed between the second LED string and the DC power supply and an open circuit being formed between the first LED string and the DC power supply.

19. An LED lamp, comprising:
a first LED string providing a first color temperature;
a second LED string connected in parallel with the first LED string, the second LED string providing a second color temperature difference from the first color temperature; and
a variable resistor connected in series with one of the first and second LED strings, the variable resistor comprising a resistance track with resistance coils wound thereon and a slider moveable along the resistance track;
wherein when a position of the slider of the variable resistor is changed, an electric current flowing through the one of the first and second LED strings is changed accordingly to adjust the color temperature of the LED lamp; and
wherein anode of the first LED string and cathode of the second LED string connect one pole of an AC power source, the variable resistor interconnected between cathode of the first LED string and another pole of the AC power source, anode of the second LED string directly connected with the another pole of the AC power source.

20. An LED lamp, comprising:
a first LED string providing a first color temperature;
a second LED string connected in parallel with the first LED string, the second LED string providing a second color temperature difference from the first color temperature; and
a variable resistor connected in series with one of the first and second LED strings, the variable resistor comprising a resistance track with resistance coils wound thereon and a slider moveable along the resistance track;
wherein when a position of the slider of the variable resistor is changed, an electric current flowing through the one of the first and second LED strings is changed accordingly to adjust the color temperature of the LED lamp; and
wherein anode of the first LED string and cathode of the second LED string connect one pole of the an AC power source, the variable resistor interconnected between anode of the second LED string and another pole of the AC power source, cathode of the first LED string directly connected with the another pole of the AC power source.

* * * * *